United States Patent
Zaffetti et al.

(10) Patent No.: US 12,343,664 B2
(45) Date of Patent: Jul. 1, 2025

(54) MONOLITHIC ADDITIVELY MANUFACTURED PUMP INLET HOUSING AND FILTER

(71) Applicant: Hamilton Sundstrand Corporation, Charlotte, NC (US)

(72) Inventors: Mark A. Zaffetti, Suffield, CT (US); Caitlin Patruski, West Springfield, MA (US); Joseph Miranda, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 440 days.

(21) Appl. No.: 17/735,479

(22) Filed: May 3, 2022

(65) Prior Publication Data
US 2022/0355227 A1   Nov. 10, 2022

Related U.S. Application Data

(60) Provisional application No. 63/184,425, filed on May 5, 2021.

(51) Int. Cl.
| | |
|---|---|
| *B01D 35/02* | (2006.01) |
| *B01D 29/11* | (2006.01) |
| *B01D 29/33* | (2006.01) |
| *B33Y 10/00* | (2015.01) |
| *B33Y 80/00* | (2015.01) |

(52) U.S. Cl.
CPC ............ *B01D 35/02* (2013.01); *B01D 29/111* (2013.01); *B01D 29/33* (2013.01); *B33Y 10/00* (2014.12); *B33Y 80/00* (2014.12); *B01D 2201/306* (2013.01)

(58) Field of Classification Search
CPC ...... B01D 35/02; B01D 29/111; B01D 29/33; B01D 2201/306; B01D 35/023; B33Y 10/00; B33Y 80/00; B22F 3/1115; B22F 5/10; B22F 10/28; F04D 29/026; F04D 29/708
See application file for complete search history.

(56) References Cited

U.S. PATENT DOCUMENTS

| | | |
|---|---|---|
| 5,511,585 A | 4/1996 | Lee, II |
| 10,597,165 B2 | 3/2020 | Corman |

(Continued)

FOREIGN PATENT DOCUMENTS

DE   102018119730 A1   2/2020

OTHER PUBLICATIONS

Extended European Search Report for EP Application No. 22171845.5, dated Oct. 5, 2022, pp. 1-8.

*Primary Examiner* — Waqaas Ali
(74) *Attorney, Agent, or Firm* — CANTOR COLBURN LLP (57) ABSTRACT

A method of manufacturing a pump inlet housing and filter for a pump assembly, wherein the pump inlet housing and filter are monolithic, the method has the steps of: defining a pump inlet housing as a housing tubular shape with an inlet aperture boundary at a housing top end, and an outlet aperture boundary at a housing bottom end; defining a lattice filter between the inlet and outlet aperture boundaries; and performing an additive manufacturing (AM) process to additively manufacture the pump inlet housing and the lattice filter such that the lattice filter is integral with the pump inlet housing.

2 Claims, 8 Drawing Sheets

(56) References Cited

U.S. PATENT DOCUMENTS

2017/0036144 A1    2/2017   Jacquerie et al.
2020/0017231 A1*  1/2020   Rhoden .................... F28F 1/36
2020/0182207 A1    6/2020   Spengler

* cited by examiner

A mounting flange is defined along an outer surface of the housing exterior wall 1010e An inlet conduit is formed integrally via the AM process with the inlet aperture boundary and includes:
a conduit first end that is integrally formed via the AM process with the inlet aperture boundary; and
a conduit body that extends away from the conduit first end to a conduit second end

FIG. 12

MONOLITHIC ADDITIVELY MANUFACTURED PUMP INLET HOUSING AND FILTER

CROSS-REFERENCE TO RELATED APPLICATIONS

This application claims the benefit of U.S. Application Ser. No. 63/184,425 filed May 5, 2021, the disclosure of which is incorporated herein by reference in its entirety.

BACKGROUND

Exemplary embodiments pertain to the art of pump inlet housings and more specifically to a monolithic additively manufactured pump inlet housing and filter.

Pump inlet housings may use filters which may be expensive, have long lead times for delivery, and may be limited in size and shape such that design options are limited for the inlet housing. In addition, such inlet housings may be large and/or heavy in order to withstand normal operational pressures. It would be beneficial for the filter to provide structural support for the pump inlet housing.

BRIEF DESCRIPTION

Disclosed is a method of manufacturing a pump inlet housing and filter for a pump assembly, wherein the pump inlet housing and filter are monolithic, the method including: defining a pump inlet housing as a housing tubular shape with an inlet aperture boundary at a housing top end, and an outlet aperture boundary at a housing bottom end; defining a lattice filter between the inlet and outlet aperture boundaries; and performing an additive manufacturing (AM) process to additively manufacture the pump inlet housing and the lattice filter such that the lattice filter is integral with the pump inlet housing.

In addition to one or more of the above disclosed aspects of the method, or as an alternate, the AM process includes applying laser bed powder fusion.

In addition to one or more of the above disclosed aspects of the method, or as an alternate, defining the pump inlet housing includes defining: a housing bottom surface at the housing bottom end, the housing bottom surface defining the outlet aperture boundary; a housing exterior wall that extends upwardly from the housing bottom surface to a housing top surface at the housing top end, wherein the housing exterior wall defines an inner surface to form a tubular cavity between the housing top and bottom surfaces, wherein the inlet aperture boundary is defined through the housing exterior wall or the housing top surface.

In addition to one or more of the above disclosed aspects of the method, or as an alternate, the lattice filter is defined as a filter tubular shape and includes: a lattice filter body that extends upwardly from a filter bottom end, located at the filter bottom end, to a filter top end that is adjacent to the housing top end; and a filter cap, at the filter top end, that is a lattice surface or a solid surface.

In addition to one or more of the above disclosed aspects of the method, or as an alternate, a mounting flange is defined along an outer surface of the housing exterior wall, wherein the mounting flange is configured to mount the pump inlet housing to a pump housing.

In addition to one or more of the above disclosed aspects of the method, or as an alternate, an inlet conduit is integrally formed via the AM process with the inlet aperture boundary, which includes: a conduit first end that is integrally formed via the AM process with the inlet aperture boundary; and a conduit body that extends away from the conduit first end to a conduit second end.

In addition to one or more of the above disclosed aspects of the method, or as an alternate, the pump inlet housing is formed with a base disk at the housing bottom end, wherein the base disk defines the outlet aperture boundary having an outlet perimeter that is smaller than a housing wall perimeter defined by the inner surface of the housing exterior wall, wherein: the lattice filter is integrally formed via the AM process with the base disk.

In addition to one or more of the above disclosed aspects of the method, or as an alternate, an outer perimeter of the lattice filter is smaller than the housing wall perimeter; and the filter cap of the lattice filter is spaced apart from the housing top end.

In addition to one or more of the above disclosed aspects of the method, or as an alternate, the housing tubular shape and the filter tubular shape are cylindrical.

In addition to one or more of the above disclosed aspects of the method, or as an alternate, the lattice filter is integrally formed via the AM process with the inner surface of the housing exterior and conforms to a shape of inner surface of the housing exterior wall, and a bottom portion of the inner surface of the housing exterior wall defines the outlet aperture boundary.

In addition to one or more of the above disclosed aspects of the method, or as an alternate, the pump inlet housing is formed with a housing shape that tapers from the housing bottom end to the housing top end.

In addition to one or more of the above disclosed aspects of the method, or as an alternate, the housing shape is defined by a first rounded convex profile extending continuously between the mounting flange to the housing top end; and the inlet aperture boundary is formed to transition to the inner surface via a second rounded convex profile that is smaller than the first rounded convex profile.

In addition to one or more of the above disclosed aspects of the method, or as an alternate, a portion of the inner surface of the housing exterior wall, that is adjacent to the inlet aperture boundary, curves inwardly to thereby locally reduce flow area, wherein the portion of the inner surface being intermediate of the housing top and bottom ends.

In addition to one or more of the above disclosed aspects of the method, or as an alternate, the filter cap is formed as the lattice surface and positioned at a skewed angle to the conduit body.

In addition to one or more of the above disclosed aspects of the method, or as an alternate, a portion of the lattice filter on a circumferentially opposing side relative to the inlet aperture boundary defines a denser filter portion than a portion on a circumferentially same side relative to the inlet aperture boundary.

Further disclosed is a pump inlet housing for a pump assembly, wherein the pump inlet housing is monolithic and includes: a pump inlet housing having a housing tubular shape with an inlet aperture boundary at a housing top end, and an outlet aperture boundary at a housing bottom end; a lattice filter that is integrally formed with the pump inlet housing via an additive manufacturing (AM) process, the lattice filter including a pump inlet housing between the inlet and outlet aperture boundaries.

In addition to one or more of the above disclosed aspects of the assembly method, or as an alternate, the pump inlet housing includes: a housing bottom surface at the housing bottom end, the housing bottom surface defining the outlet aperture boundary; and a housing exterior wall that extends upwardly from the housing bottom surface to a housing top surface at the housing top end, wherein the housing exterior wall defines an inner surface to form a tubular cavity between the housing top and bottom surfaces, wherein the inlet aperture boundary is defined through the housing exterior wall or the housing top surface.

In addition to one or more of the above disclosed aspects of the assembly, or as an alternate, the lattice filter is defined as a filter tubular shape and includes: a lattice filter body that extends upwardly from a filter bottom end, located at the filter bottom end, to a filter top end that is adjacent to the housing top end; and a filter cap, at the filter top end, that is a lattice surface or a solid surface.

In addition to one or more of the above disclosed aspects of the assembly, or as an alternate, a mounting flange is defined along an outer surface of the housing exterior wall, wherein the mounting flange is configured to mount the pump inlet housing to a pump housing.

In addition to one or more of the above disclosed aspects of the assembly, or as an alternate, an inlet conduit is integrally formed via the AM process with the inlet aperture boundary, which includes: a conduit first end that is integrally formed via the AM process with the inlet aperture boundary; and a conduit body that extends away from the conduit first end to a conduit second end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Pumps in fluid systems use filters so that contaminants are captured and not passed to the pump and then pumped downstream from the pump. The utilization of filters may minimize a reduction in performance and damage to downstream parts. The filter is typically an item that is insertable into a pump inlet housing. There are various drawbacks to having the filter as a separate item from the pump inlet housing. Thus, according to embodiments, the filter and pump inlet housing are formed as a monolithic part, e.g., utilizing additive manufacturing (AM), and specifically Powder bed fusion (PBF). That is, with AM and software computer aided design (CAD) technologies, it may be feasible to design and fabricate a pump inlet housing and filter as a monolithic structure utilizing powder bed fusion AM techniques. For example, the AM process may enable more flexibility in the design of the monolithic structure.

Figure 1A:
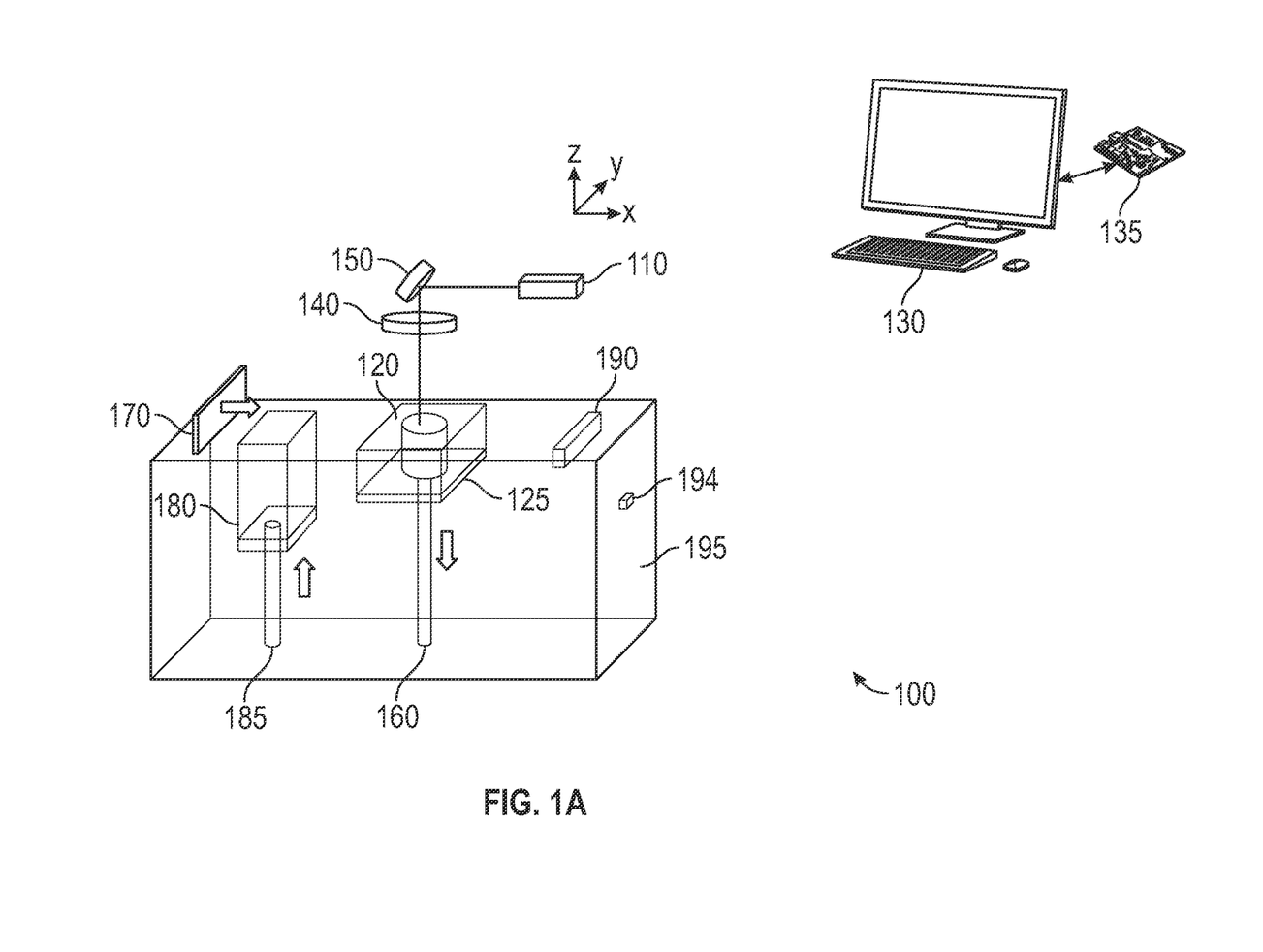
FIG. 1A shows a system for applying a powder bed fusion (PBF) process used to manufacture a pump inlet housing and filter according to one or more embodiments.

Turning to FIG. 1A, a system 100 for performing PBF is generally shown and described. The system 100 uses a high-energy power laser (laser) 110 to selectively melt or sinter a metallic powder that is located in the powder bed 120. The processes utilize a platform 125 to hold the powder and build upon. In a laser powder bed process, the laser 110 is operationally connected via wired or wireless networks to a computer 130 with an associated controller 135. The laser beam from the laser passes through a system of lenses 140 and is reflected by a mirror 150 onto the platform 125. The mirror 150 is used to control the laser beam spot movement on the planar (x and y) directions on designed paths. After a layer of powder is selectively melted, the platform 125 moves downward via action of a build piston 160, a recoating blade 170 or brush pushes another layer of fresh powder from a powder dispenser tank 180, which may be moved via a powder supply piston 185, to a top of the previously built surface, and the laser scanning process is repeated. According to an embodiment, aluminum may be the material utilized as the powder. Other materials may also be utilized depending on pressures, temperature and working fluids, e.g., steel, titanium, etc. An overflow container 190 may be provided to recover redundant powder once a layer has been spread. One or more sensors 194 may be provided by which the computer 130 monitors progress of the PBF process. The build chamber 195 of the system 100 is filled with an inert gas, argon in most cases, to avoid oxidization of the metal as it melts and resolidifies.

Figure 1B:
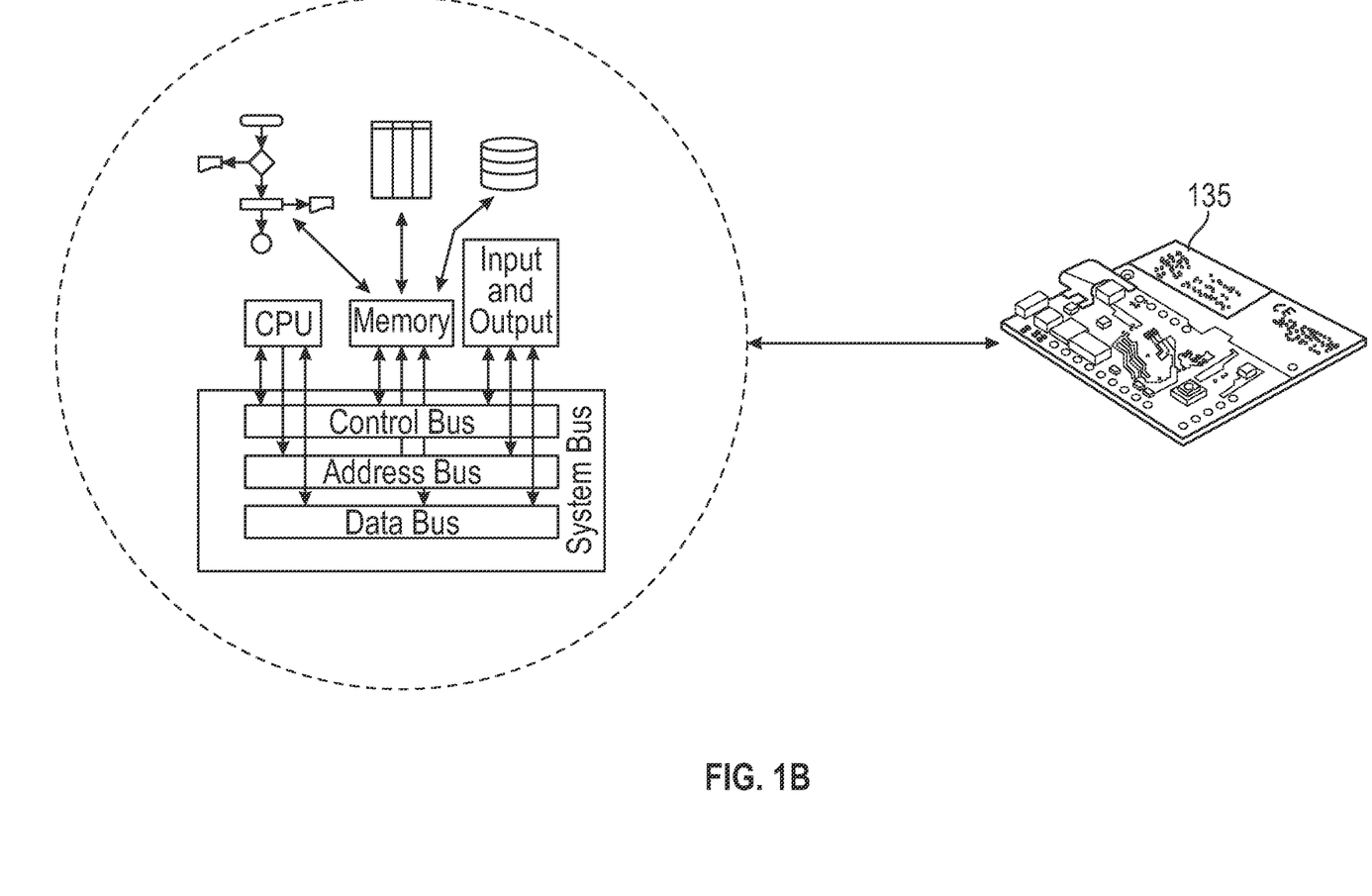
FIG. 1B shows aspects of a controller utilized in FIG. 1A.

As shown in FIG. 1B, the controller 135 identified herein may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection with other processors. Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

Figure 2:
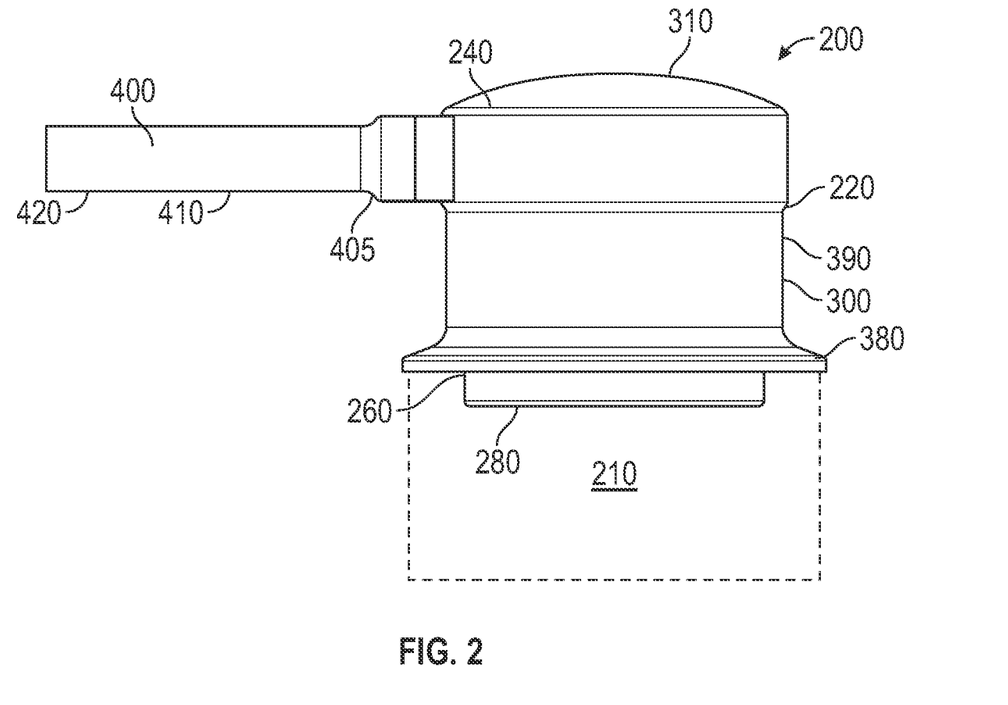
FIG. 2 shows a monolithic pump inlet housing and filter manufactured using a PBF process according to one or more embodiments.
Figure 3:
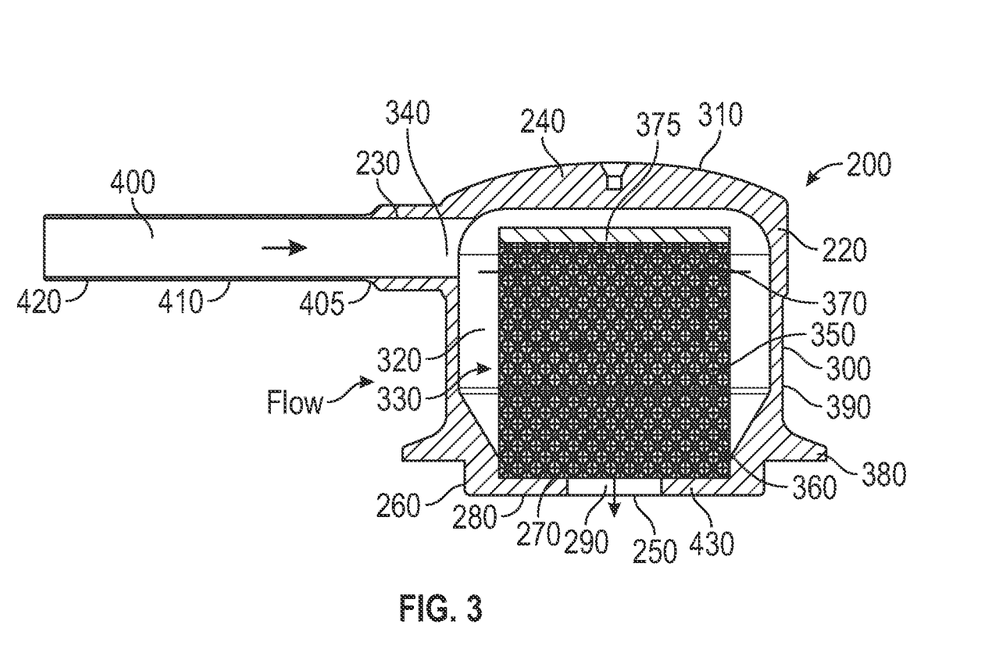
FIG. 3 shows a cross section of the monolithic pump inlet housing and filter of FIG. 2.
Figure 4:
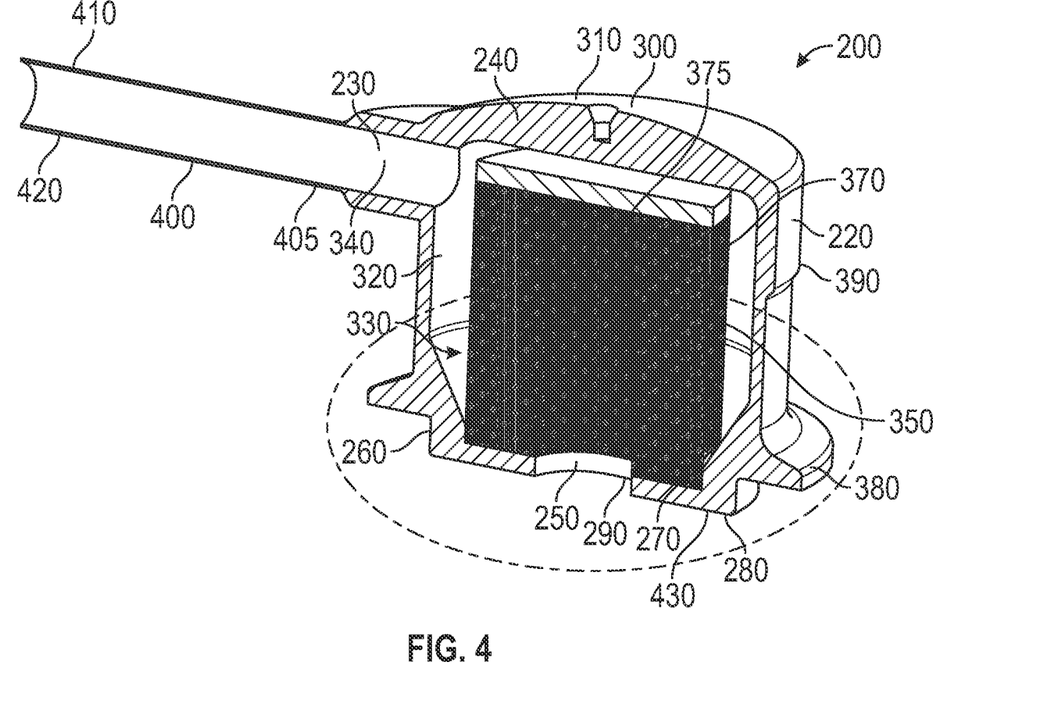
FIG. 4 shows a perspective view of the cross section of the monolithic pump inlet housing and filter of FIG. 2.
Figure 5:
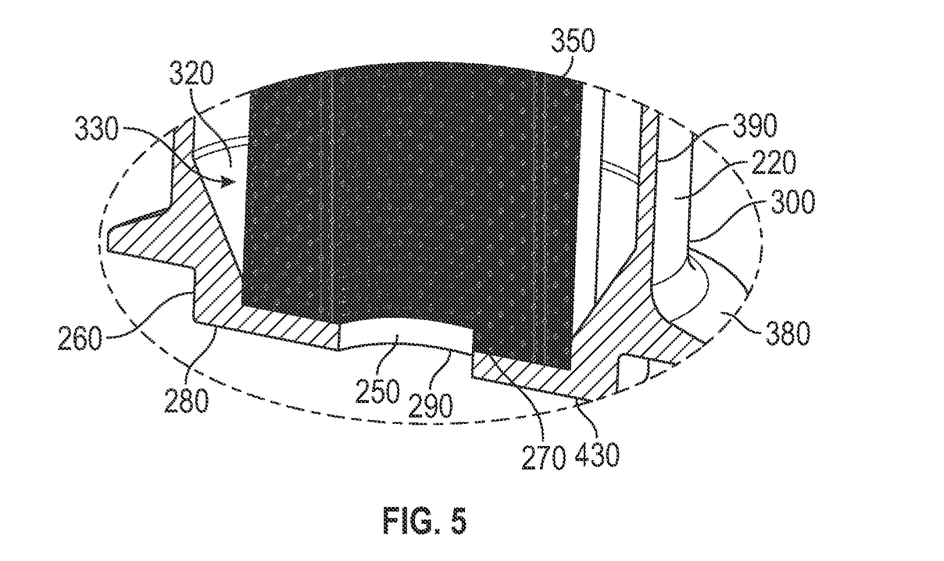
FIG. 5 shows a section of the cross section of the monolithic pump inlet housing and filter of FIG. 4.
Figure 6:
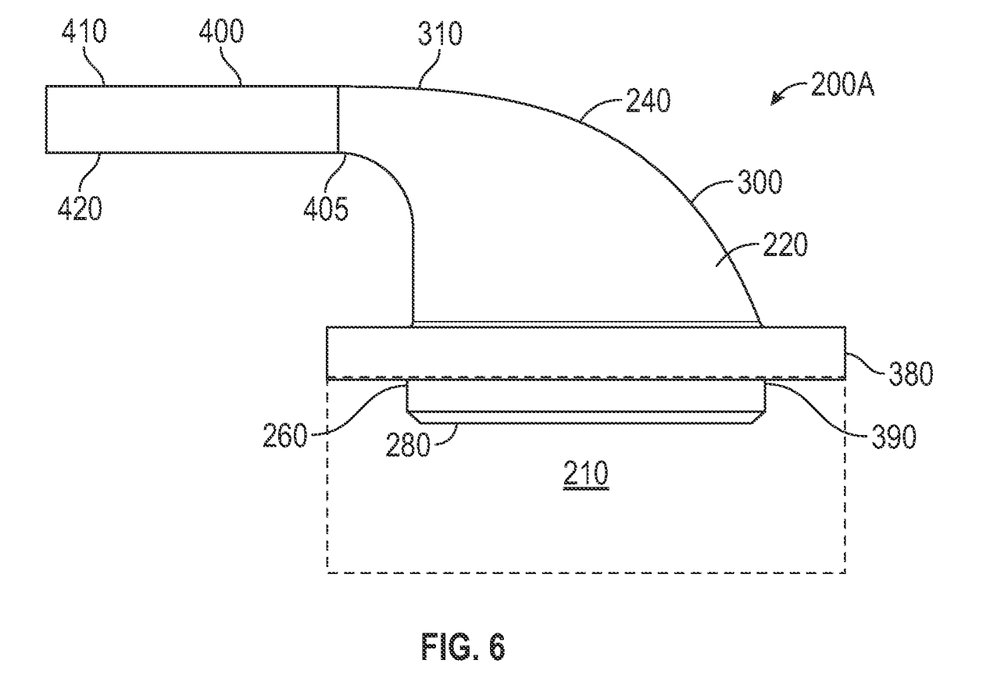
FIG. 6 shows another exemplary monolithic pump inlet housing and filter using a PBF process according to one or more embodiments.
Figure 7:
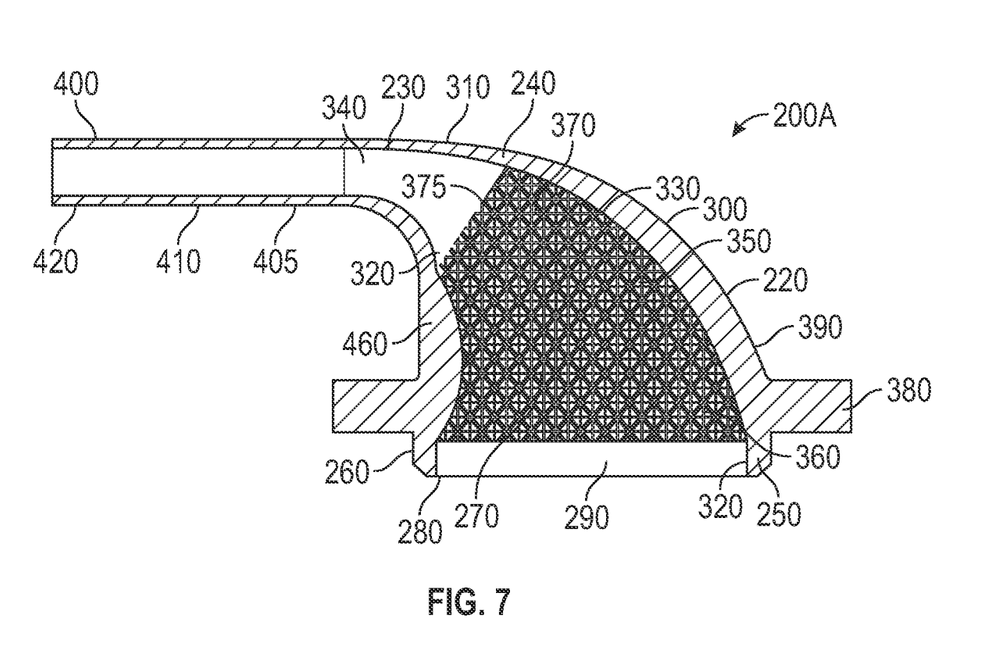
FIG. 7 shows a cross section of the monolithic pump inlet housing and filter of FIG. 6.
Figure 8:
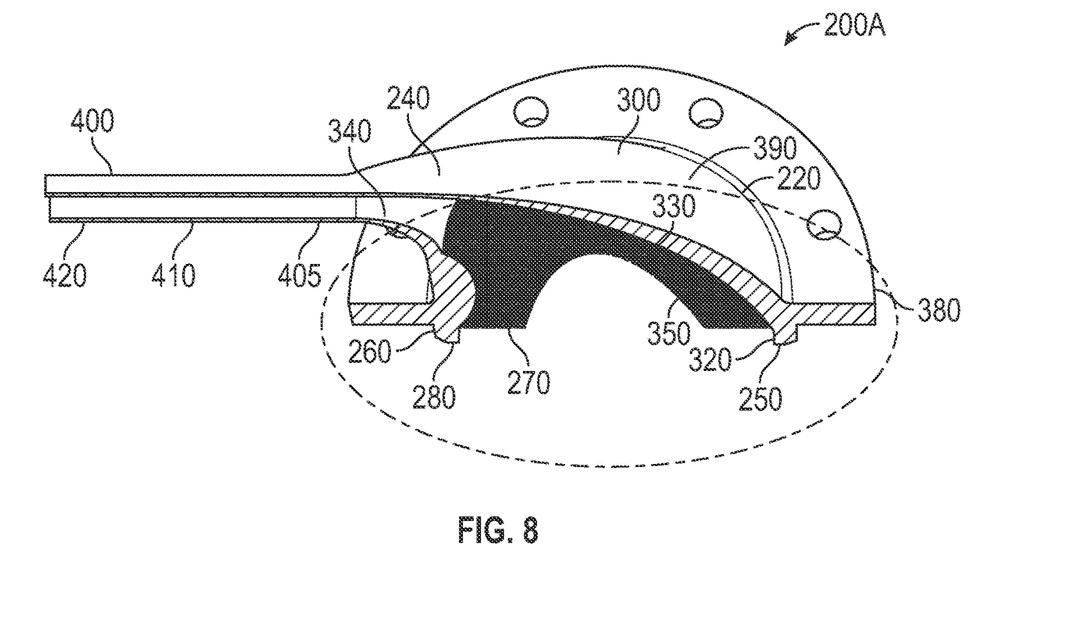
FIG. 8 shows a perspective view of the cross section of the monolithic pump inlet housing and filter of FIG. 6.
Figure 9:
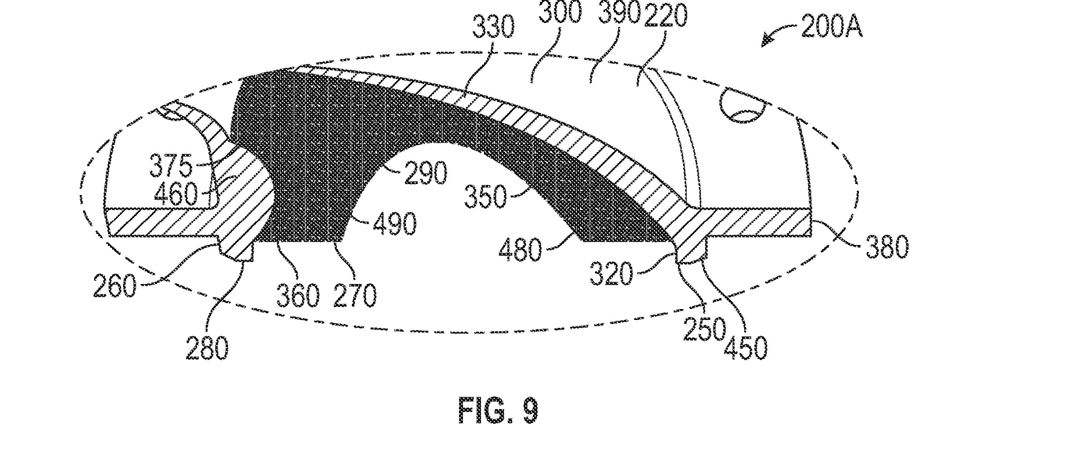
FIG. 9 shows a section of the cross section of the monolithic pump inlet housing and filter of FIG. 8.
Figure 10:
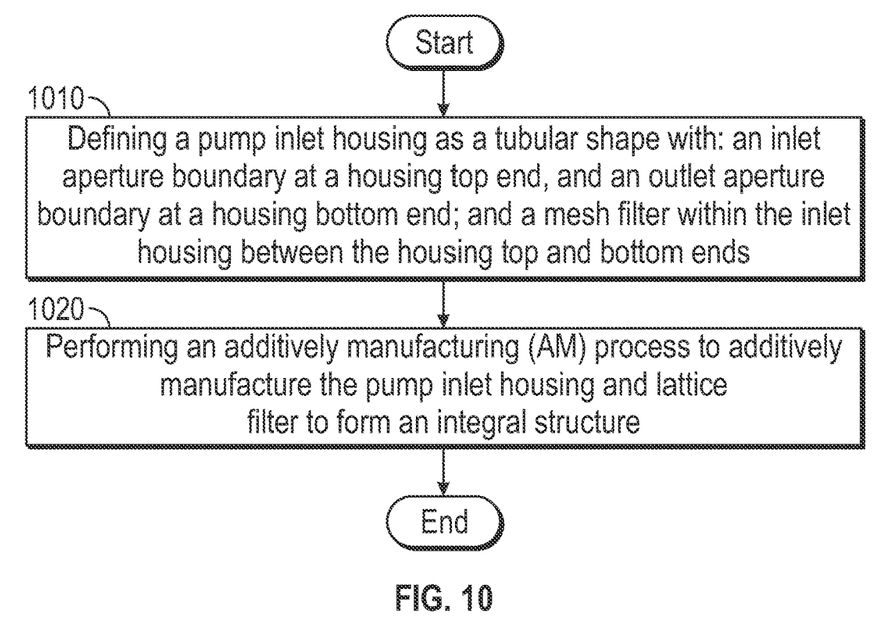
FIGS. 10-12 are flowcharts showing a method of fabricating the monolithic pump inlet housings and filter of FIGS. 2 and 6 according to one or more embodiments.
Figure 11:
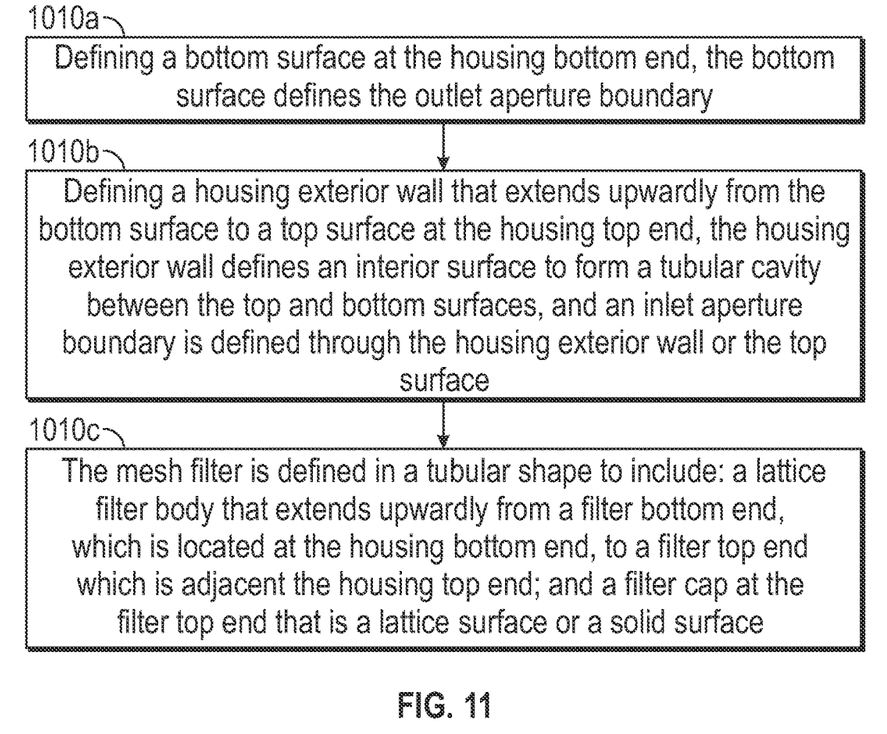
Figure 12:
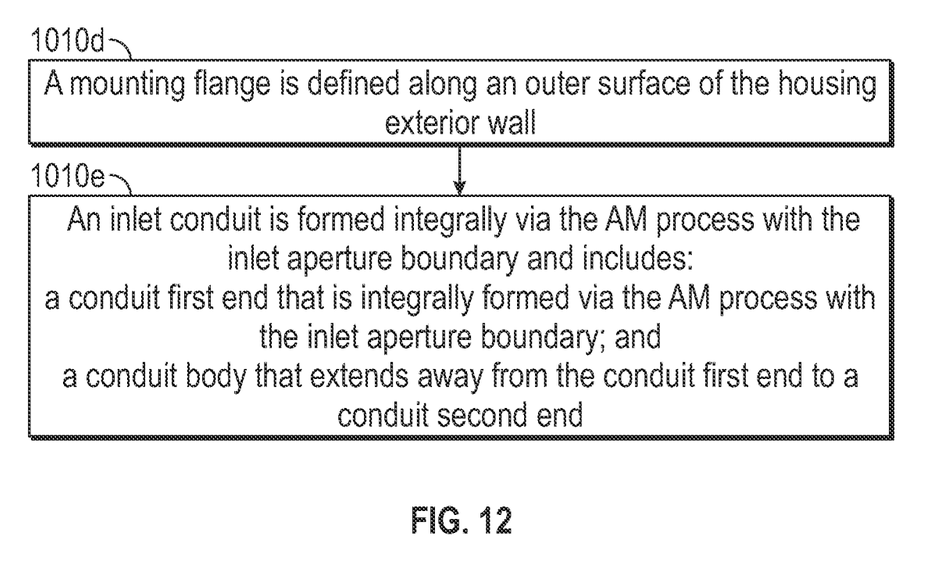

Turning to FIGS. 10-12, a flowchart shows a method of manufacturing a pair of disclosed pump inlet housings and respective filters 200 (FIGS. 2-5) and 200A (FIGS. 6-10) for a pump 210 (shown schematically in FIGS. 2 and 6). The pump inlet housings and respective filters 200, 200A that are manufactured by the disclosed process are monolithic. Turning to FIG. 10, as shown in block 1010, for each of the pump inlet housings and respective filters 200, 200A, the method includes defining a pump inlet housing 220 as a housing tubular shape. The pump inlet housing 220 is defined to include an inlet aperture boundary 230 at a housing top end 240 and an outlet aperture boundary 250 at a housing bottom end 260. A lattice filter 270 is defined to be within each pump inlet housing 220 between the housing top and bottom ends 240, 260. That is, the configuration of the pump inlet housing 220 is defined on a computer readable medium, such as disclosed below, which will be utilized the by the computer 130 (FIG. 1) to manufacture the pump inlet housings and respective filters 200, 200A via PBF using, e.g., the system 100 shown in FIG. 1. As shown in block 1020, the method includes performing an AM process to additively manufacture the pump inlet housings 220 and the respective lattice filters as integral (e.g., monolithic, unitary) structures.

Turning to FIG. 11, aspects of defining the pump inlet housing 220 (block 1010) of each pump inlet housing and respective filter 200, 200A further includes, as shown in block 1010*a*, defining a housing bottom surface 280 at the housing bottom end 260. The housing bottom surface 280 defines the outlet aperture boundary 250 that forms an outlet aperture 290. As shown in block 1010*b*, defining the pump inlet housing 220 further includes defining a housing exterior wall 300 that extends upwardly from the housing bottom surface 280 to a housing top surface 310 at the housing top end 240. The housing exterior wall 300 defines an inner surface 320 to form a tubular cavity 330 between the housing top and bottom surfaces 310, 280. Further, the inlet aperture boundary 230, that forms an inlet aperture 340, is defined through the housing exterior wall 300 or the housing top surface 310.

As shown in block 1010*c*, the lattice filter 270 may be defined as a filter tubular shape. More specifically, a lattice filter body 350 may extend upwardly from a filter bottom end 360, which may be located at the housing bottom end 260, to a filter top end 370 that is adjacent the housing top end 240. A filter cap 375, at the filter top end 370, may be configured as a lattice surface or a solid surface. A solid cap would require flow to enter the lattice filter 270 via other exposed perimeter surfaces of the filter, while a latticed cap would allow fluid to entire the filter via the top of the filter.

Turning to FIG. 12, further aspects of defining the pump inlet housing 220 (block 1010) for the pump inlet housings and filters 200, 200A are shown. As shown in block 1010*d*, a mounting flange 380 is defined along an outer surface 390 of the housing exterior wall 300. The mounting flange 380 is configured to mount the pump inlet housings and respective filters 200, 200A to a pump 210. As shown in block 1010*e*, an inlet conduit 400 may be integrally formed via the AM process with the inlet aperture boundary 230. The inlet conduit 400 may include a conduit first end 405 that is integrally formed via the AM process with the inlet aperture boundary 230. A conduit body 410 may extend away from the conduit first end 405 to a conduit second end 420.

The above description is common to the pump inlet housing and filter 200 shown in FIGS. 2-5 and the pump inlet housing and filter 200A shown in FIGS. 6-9.

Turning now to the pump inlet housing and filter 200 shown in FIGS. 2-5, the pump inlet housing 220 may be formed with a base disk 430 at the housing bottom end 260. The base disk 430 defines the outlet aperture boundary 250 having an outlet perimeter that is smaller than a housing wall perimeter defined by the inner surface 320 of the housing exterior wall 300. The lattice filter 270 may be integrally formed via the AM process with the base disk 430.

An outer perimeter of the lattice filter 270 may be smaller than the housing wall perimeter. The filter cap 375 of the lattice filter 270 may be spaced apart from the housing top end 240. This enables flow into the lattice filter 270 along the path shown in FIG. 3, e.g., through its outer perimeter.

As shown in FIGS. 2-5, the housing tubular shape of the pump inlet housing 220 and the filter tubular shape of the lattice filter 270 may both be cylindrical. However, other shapes are within the scope of the embodiments.

Turning now to the FIGS. 6-9, the lattice filter 270 may be formed via the AM process so that it is integral with the inner surface 320 of the housing exterior wall 300 and conforms to a shape of inner surface of the housing exterior wall. A bottom portion 450 (FIG. 9) of the inner surface 320 of the housing exterior wall 300 may form the outlet aperture boundary 250. As shown in the figures, the housing shape of the pump inlet housing 220 may taper from the housing bottom end 260 to the housing top end 240.

The taper shape (or sweep) of the pump inlet housing may be defined by a first rounded convex profile extending continuously between the mounting flange 380 to the housing top end 240. The inlet aperture boundary 230 transitions to the inner surface 320 via a second rounded convex profile that is smaller than the first rounded convex profile. This configuration smoothly directs fluid flowing through the pump inlet housing along a curved path from the inlet conduit to the outlet aperture. This may reduce friction losses and pressure drops through the pump inlet housing. In addition, the filter may provide structural rigidity to enable the design of FIGS. 6-9 which might otherwise fail under normal operational pressures.

A portion 460 (FIGS. 7 and 9) of the inner surface 320 of the housing exterior wall 300, that is adjacent the inlet aperture boundary 230, curves inwardly. This portion 460 is intermediate of the housing top and bottom ends. This configuration locally reduces a flow area away from the outlet aperture while providing a relatively increased flow area at the outlet aperture, to provide desired flow characteristics into the pump.

The filter cap 375 may be formed as a lattice surface and positioned at a skewed angle (neither parallel nor perpendicular) to the conduit body 410. This configuration assists in redirecting fluid flowing into the pump inlet housing 220 from the inlet conduit 400 so that the fluid flows toward the outlet aperture boundary 250. This configuration, along with the shape of the pump inlet housing, may reduce friction loss and pressure drops through the pump inlet housing 220.

An outer filter portion 480 (FIG. 9) of the lattice filter body 350, on a circumferentially opposing side relative to the inlet aperture boundary 230, may define a denser filter portion than an inner filter portion 490 on a circumferentially same side relative to the inlet aperture boundary. This configuration may locally increase flow resistance, which along with other aspects identified for the filter housing 220, may provide desired flow characteristics into the pump.

As indicated, the lattice filter 270 may be designed to provide structural support to the pump inlet housing 220, reducing the required structural characteristics of the pump inlet housing itself. That is, the structural integrity of the pump inlet housing 220 may be at least partially provided by the lattice filter 270 rather than being entirely provided from the design of the housing structure itself.

Thus, the disclosed embodiments reduce a complex assembly process to a process of growing a monolithic structure. Benefits of the disclosed embodiments include: 1) reducing part count and simplifying an overall assembly process because filter is part of the pump inlet housing; 2) providing for many different types of configurations, e.g., the pump inlet housing may have a greater sweep than machining may allow, and the shape, size and design of the filter may be varied and optimized for flow and pressure drop; and 3) utilizing the filter can as a structural support to the housing, being that the filter is integral to the housing, while still functioning as a filter.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inlet housing for a pump assembly, wherein the pump inlet housing is monolithic and comprises:

the inlet housing for the pump assembly having a housing tubular shape with an inlet aperture boundary at a housing top end, and an outlet aperture boundary at a housing bottom end;

a lattice filter that is integrally formed with the pump inlet housing via an additive manufacturing (AM) process, the lattice filter including the pump inlet housing between the inlet and outlet aperture boundaries, wherein
the inlet housing for the pump assembly includes:
a housing bottom surface at the housing bottom end, the housing bottom surface defining the outlet aperture boundary;
a housing exterior wall that extends upwardly from the housing bottom surface to a housing top surface at the housing top end, wherein the housing exterior wall defines an inner surface to form a tubular cavity between the housing top and bottom surfaces,
wherein the inlet aperture boundary is defined through the housing exterior wall or the housing top surface;
a mounting flange is defined along an outer surface of the housing exterior wall, wherein the mounting flange is configured to mount the pump inlet housing to a pump housing;
an inlet conduit is integrally formed via the AM process with the inlet aperture boundary, which includes:
a conduit first end that is integrally formed via the AM process with the inlet aperture boundary; and
a conduit body that extends away from the conduit first end and the housing to a conduit second end;
the lattice filter is integrally formed via the AM process with the inner surface of the housing exterior and conforms to a shape of inner surface of the housing exterior wall; and
a bottom portion of the inner surface of the housing exterior wall defines the outlet aperture boundary;
and wherein:
the pump inlet housing is formed with a housing shape that tapers from the housing bottom end to the housing top end;
the housing shape is defined by a first rounded convex profile extending continuously between the mounting flange to the housing top end; and
the inlet aperture boundary is formed to transition to the inner surface via a second rounded convex profile that is smaller than the first rounded convex profile;
a portion of the inner surface of the housing exterior wall, that is adjacent to the inlet aperture boundary, curves inwardly to thereby locally reduce flow area,
wherein the portion of the inner surface being intermediate of the housing top and bottom ends.

2. The pump inlet housing of claim 1, wherein
the lattice filter is defined as a filter tubular shape and includes:
a lattice filter body that extends upwardly from a filter bottom end, to a filter top end that is adjacent to the housing top end; and
a filter cap, at the filter top end, that is a lattice surface or a solid surface.

* * * * *